Sept. 9, 1969  S. E. GAIL  3,466,478
BEARING GAS PRESSURE EQUALIZING STRUCTURE
Filed Jan. 9, 1967  4 Sheets-Sheet 3

INVENTOR.
STEWART E. GAIL
BY Bosworth, Sessions,
Herndon & Knowles
ATTORNEYS.

United States Patent Office 3,466,478
Patented Sept. 9, 1969

3,466,478
BEARING GAS PRESSURE EQUALIZING
STRUCTURE
Stewart E. Gail, Northfield, Ohio, assignor to Lear Siegler,
Inc., Santa Monica, Calif., a corporation of Delaware
Filed Jan. 9, 1967, Ser. No. 608,169
Int. Cl. H02k 7/08
U.S. Cl. 310—90        12 Claims

ABSTRACT OF THE DISCLOSURE

A dynamoelectric machine in which a rotor is supported by a bearing or bearings such as anti-friction bearings, and through which a flow of cooling gas normally provides gas pressure differentials across the bearings, and which has pressure equalizing passages across the bearings and flow restricting structures adjacent one or both sides of the bearings for substantially equalizing the gas pressure on both sides of the bearings to prevent lubricant from being blown out of the bearings or contaminants from being blown into the bearings.

Specification

This invention relates to dynamoelectric machines cooled by air or gas flow through them and having rotors supported by bearings, and more particularly to means for substantially equalizing gas pressures on both sides of a bearing or bearings, particularly when there is a substantially different pressure of air or other gas on one side of the bearing than the other and/or when there is a tendency for contaminants to be driven into the bearing.

The invention provides particular advantages in connection with dynamoelectric machines used in aircraft, and, therefore, will be described below primarily in connection with such a machine.

In such dynamoelectric machines, there generally is a rotor supported by bearings from the housing which also supports stationary coils, cores, and other parts. To handle the required power while keeping weight to a minimum, the rotor turns at many thousands of revolutions per minute. This necessitates the use of anti-friction bearings to provide adequate support and a low friction and high rotational capability for the rotor. These bearings are generally of the permanently lubricated type in which the lubricant is intended to be retained in the bearings without replenishment during the service life of the machine or between service periods.

One of the problems encountered in the operation of dynamoelectric machines is that of dissipating the heat produced by electric current flowing through the various windings. In certain aircraft uses, this heat is dissipated by causing ambient air to pass through the housing of the dynamoelectric machine in contact with the various heated windings, cores, and other parts so that undesired heat is removed by transfer to such air.

When, however, a stream of cooling air is passed through the dynamoelectric machine, there is commonly a pressure drop across the bearing or bearings which can be quite substantial, especially in high-speed aircraft operation.

The pressure differential across the bearing may be, and often is, sufficient to blow out the lubricant from the bearing. Loss of lubricant can contaminate the interior, and/or the displaced lubricant can cause bearing failure, and/or the displaced lubricant can contaminate the interior of the dynamoelectric machine or other portions of the aircraft. Moreover, other contaminants can enter the bearing from the air blown against the bearing, or from other rotating parts on the aircraft that fling them against the bearing.

Summary

An object of the invention is the provision of bearing structure that will avoid or overcome such difficulties. A further object is the provision of a structure in which both sides of the bearing are exposed to substantially equal gas pressures, though there is a substantial pressure differential across the entire bearing assembly, including the pressure equalizing bearing structures. A further object is the provision of a dynamoelectric machine adapted to have a current of cooling air passed through it, in which displacement of lubricant from the bearings is minimized or eliminated even though there is substantial difference in pressure of air between the upstream and downstream sides of the bearing. Another object is the provision of a dynamoelectric machine in which a bearing is shielded and protected against entry of contaminants.

The foregoing objects and advantages are accomplished by a dynamoelectric machine in which partition means are provided to form a relatively small orifice on at least the side of the bearing at which lower gas pressure normally exists to restrict flow of gas from the space between said partition means and said bearing, and in which relatively large passage means are provided for maintaining on the side of the bearing ordinarily exposed to lower pressure a gas pressure substantially as high as that on the side of the bearing exposed to higher pressure. According to another aspect, means are provided to maintain a gas pressure on both sides of the bearing that is substantially the same and/or higher than the pressure on either side of the entire bearing assembly, including the pressure maintaining means.

These and other objects and features of the invention will become apparent from the following description of three preferred embodiments in connection with the accompanying drawings in which.

Figure 1:
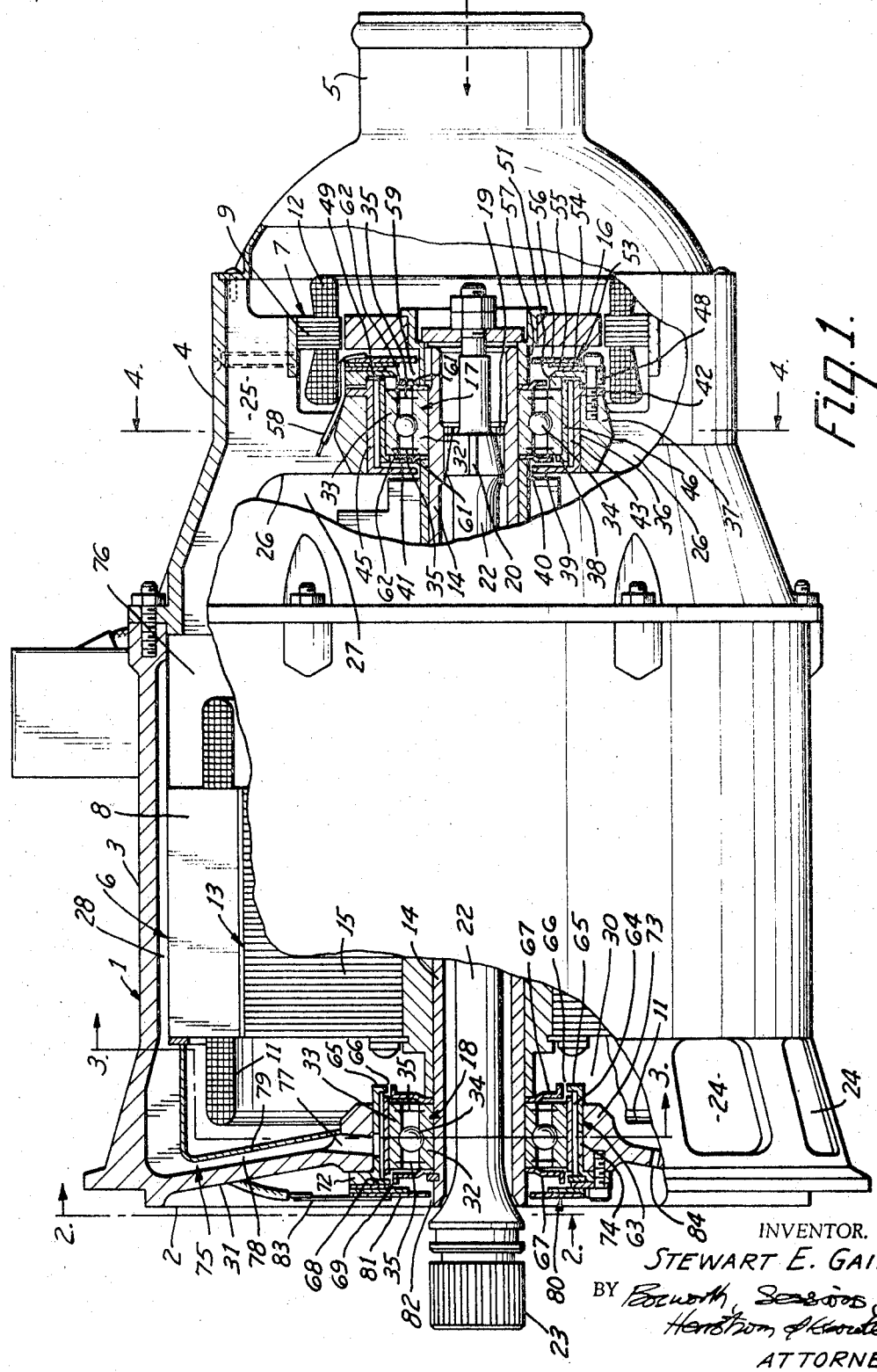
FIGURE 1 shows a dynamoelectric machine having front and rear bearing structures embodying the invention, the machine being adapted to have a stream of air pass longitudinally therethrough from one end to the other for cooling purposes.

Referring now to the drawings, the dynamoelectric machine shown in FIGURE 1 comprises a housing 1 that is adapted to be mounted by its rear end 2 on the accessory drive pad of an aircraft engine. The housing comprises generally cylindrical portions 3 and 4, the latter terminating in air inlet conduit 5. In its interior, the housing fixedly carries in a known manner conventional stators 6 and 7, respectively, comprising cores 8 and 9 and windings 11 and 12. The machine also comprises conventional rotor 13 comprising a hollow shaft 14 carrying rotor cores 15 and 16 within stators 6 and 7. Shaft 14 is supported for rotation within housing 1 by anti-friction bearings 17 and 18; it is hollow and has internal splines 19 that engage external splines 20 on one end of quill shaft 22. A gear 23 is provided on the other end of outer shaft 22 for driving engagement with suitable conventional power means (not shown) on the aircraft; the rotor is thus positively rotated.

Cooling air entering inlet conduit 5 passes axially through the housing 1, discharging through openings 24 at the rear of the housing. Entering air passes through the spaces 25 between the radial arms 26 defining a front bearing supporting spider, then into the space 27 between the front bearing and the rotor core 15 and stator 6, then through passages 28 (FIGURE 3) between the stator core 8 and the housing, between the extended ribs 29 and into space 30, between the rear wall 31 and rotor core 15 and stator 6, and out through openings 24, thus cooling the heated parts.

Bearings 17 and 18 are shown as conventional ball bearings, each having an inner race 32 carried on hollow shaft 14, an outer race 33, and balls 34. Each bearing is adapted to retain lubricant and has conventional lubricant retaining means or seals 35. Outer race 33 of front bearing 17 is clamped into an annular bearing support member 36 that is fixed by a press fit and bolted in hub 37 supported by the radial arms 26 of the front bearing support spider.

At its rear, bearing support member 36 has a first inwardly extending radial flange 38 that engages and locates the rear of outer race 33, and another inwardly extending radial flange 39 axially spaced from the first and radially separated only by narrow annular gap 40 from the exterior of hollow shaft 14. Bearing support member 36 also has a radial flange 42 extending outwardly to engage the front face of hub 37 to locate member 36 axially. Annular bearing support member 36 also has numerous axial passages 43 that extend from the front face of member 36 rearwardly and open into space 41 on the bearing side of radial flange 39.

Figure 4:
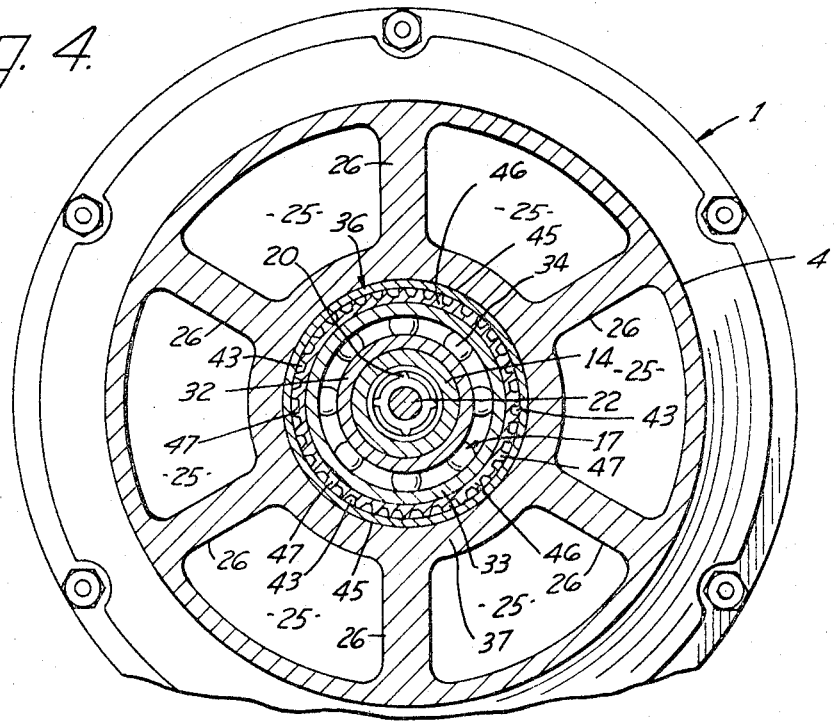
FIGURE 4 is a section along line 4—4 of FIGURE 1.

Preferably, bearing support member 36 is prefabricated from an outer sleeve 45 (FIGURE 4) having a smooth inner surface and flanges 39 and 42 formed thereon; and an inner sleeve member 46 having a smooth inner surface and an outer surface having spaced splines 47 and flange 38. The inner surface of outer sleeve 45 and the outer edges of the splines are joined, as by brazing, to form a rigid unitary structure in which the passages 43 are formed by the spaces between the splines 47 and adjoining inner surface portions of outer sleeve 45.

An annular bearing retainer 48 is fixed to hub 37. It closely fits the outer surface of bearing support 36 and has an inwardly extending radial flange 49 and axially inwardly extending spaced lugs 51 that engage the front of outer bearing race 22 to clamp the bearing assembly in place.

Member 48 also supports a known rotor rub detector 53 comprising a metal supporting ring 54 fixed on member 48, intermediate insulating ring 55 fixed to ring 54, and an electrically conductive detector ring 56 fixed to the insulating ring and having its inner circular edge separated by a narrow gap 57 from the outer surface of hollow shaft 14 to contact it in the event of bearing malfunction or failure and the eccentric rotation of the rotor. An electrical conductor 58 fixed to detector ring 56 is connected to known means to signal or shut down operation if the rotor touches the detector ring. The detector 53, thus, essentially closes off a space 59 immediately adjacent the bearing. Preferably, radial bearing shields 61 are fixed to hollow shaft 14 to aid in keeping particles of dirt and other contaminants from the interior of the bearing.

It is apparent that when air enters the inlet conduit member 5 in the direction of the arrow in FIGURE 1, flow restricting variations in the passages within the dynamoelectric machine normally cause a substantially higher pressure at the front than at the rear of the front bearing structure, for example, due to the pressure drop across the restrictions. As pointed out above, such a pressure differential across the bearing is undesirable because it tends to drive lubricant out of the bearing. However, in the structure illustrated, substantially equal pressures are maintained in the space 59 between the front of bearing 17 and rub detector 53, and in space 41 between the rear of the bearing and the rear flange or partition 39, and in passages 43 in bearing support 36 so that the bearing itself and its lubricant are subjected to substantially no deleterious pressure differential. The pressure drop normally present across the bearing is relocated or made to occur at the restricted orifices comprising gaps 57 and 40. The spaces 59 and 41 on either side of the bearing and between the gaps 57 and 40 are maintained at substantially the same pressure through relatively unrestricted and larger passages 43. The cross-sectional areas of gap 57 or 40 might be, for example, only one-tenth that provided by axial passages 43. This would subject the two sides of the bearing to approximately only $\frac{1}{100}$ of the total pressure differential across the whole bearing assembly. The pressure of air on both sides of the bearing, therefore, is essentially equal and static, and there is substantially no pressure drop across the bearing itself. Consequently, there is no tendency for lubricant to be blown out of bearing 17 from impact pressures of air on the bearing or from a pressure differential between the front and rear sides of the bearing.

The rub detector and front shield or dirt slinger 61 also mechanically prevents contaminants from being blown into the bearing seals from the front, and the flange and rear shield 61 prevent entrance of contaminants from the rear of the bearing.

Figure 3:
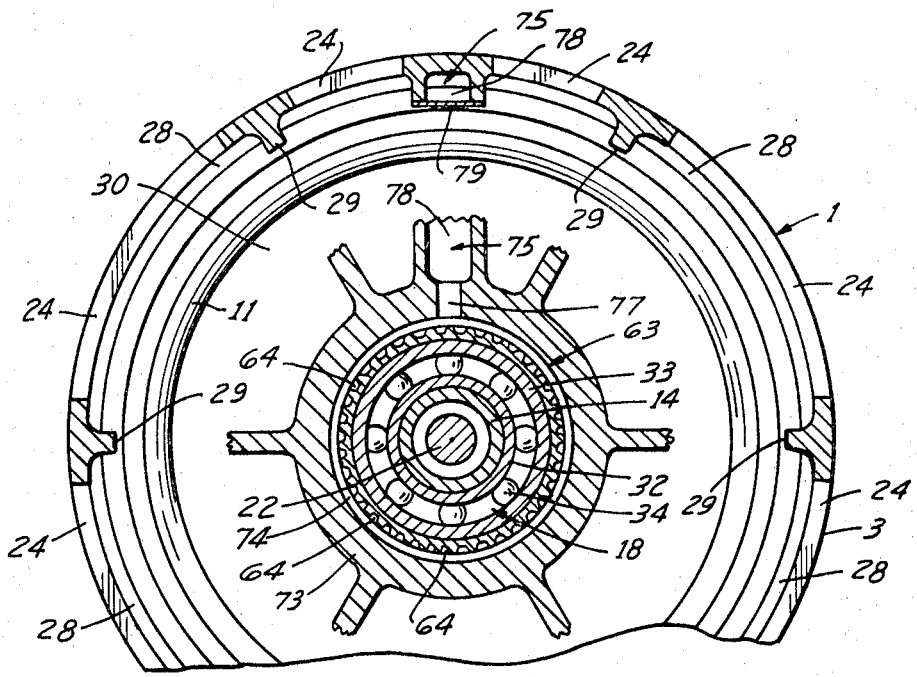
FIGURE 3 is a section along line 3—3 of FIGURE 1.

In the rear bearing 18 of FIGURES 1, 3, the inner race 32 is conventionally fixed to the hollow shaft 14; and, the outer race is mounted by a slip fit in bearing support member 63. Member 63 may be prefabricated similarly to front bearing support 36 with axial passages 64 similar to passages 43. Bearing support 63 also includes front inwardly extending radial flange 65 which, with an axial flange on front bearing shield 67, forms a partition having a narrow gap or orifice 66. It also includes a partition comprised of a rear inwardly extending radial flange 68 separated by narrow gap 69 from an axial flange of rear shield 67. The axial flanges on bearing shields 67 serve to maintain the small gaps 66 and 69 constant in cross-sectional area in spite of limited axial displacement of slip mounted bearing 18. Member 63 also includes an outwardly extending radial flange 72 by which it is secured in hub 73 in rear wall 31 of housing 1.

Furthermore, there is an annular passage 74 in bearing support 63 (FIGURES 1 and 3), communicating with each axial passage 64. Passage 74 is defined, for example, by a groove cut through the outer sleeve of bearing support 63 and the interior of the bore in hub 73 holding bearing support 63. This annular passage 74 communicates with a passage 75 formed on and along rear wall 31 of the housing and along the upper portion of its lateral wall 3 and opening into the space 76 adjacent the upstream end of rotor core 15 and stator 6. Passage 75 is formed of a hole 77 in hub 73 and a channel 78 in housing 1 that is closed by member 79 and by the outer surface of stator core 8.

A rotor rub detector 80, similar to detector 53, is supported from bearing support 63 and comprises a detector plate 81 separated from the exterior of the rotor shaft by a narrow gap 82 and connected by conductor 83 to suitable alarm or shutoff means.

Figure 2:
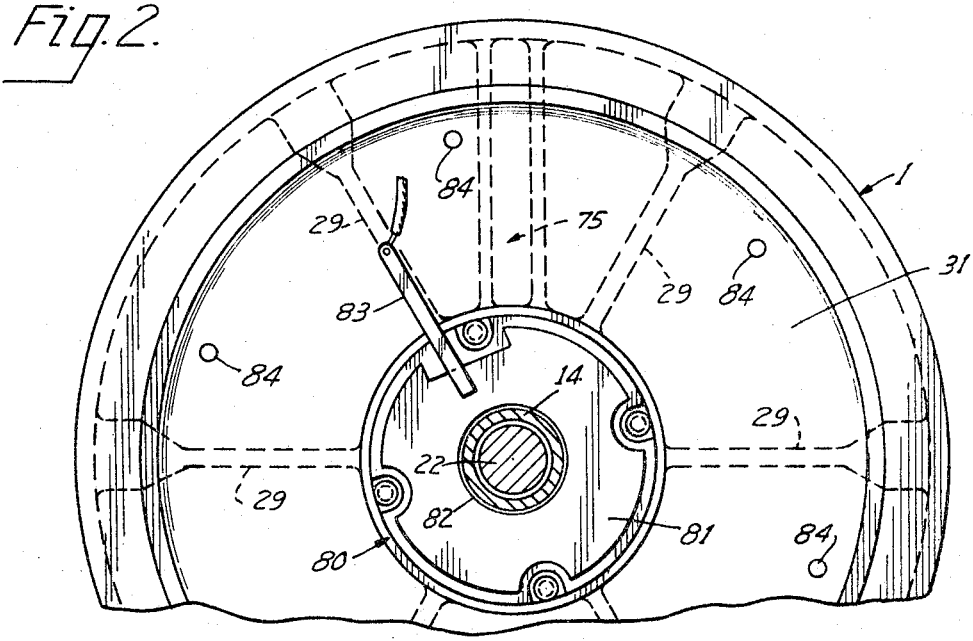
FIGURE 2 is a rear end elevation from line 2—2 of FIGURE 1.

Air in the space 76 in the housing adjacent the upstream end of stator and rotor cores 8 and 15 is at a substantially higher pressure than air in the space 30 between the rear of these cores and the rear wall 31 due to the pressure drop across these cores and discharge of air through openings 24. Since gaps 66 and 69 comprise small flow restricting orifices of substantially smaller cross-sectional area than passage 75, annular passage 74 and axial passages 64, the substantially higher pressure of space 76 is present in and around bearing 18 in the space between gaps 66 and 69. Consequently, both sides of rear bearing 18 are subjected to substantially the same air pressure that is supplied between its ends and such pressure is higher than the pressure outside the bearing assembly. Since the pressure on both sides of the bearing is identical, there is no tendency for lubricant to be blown out of the bearing. Furthermore, the higher air pressure around the bearing causes a continual outward flow of air through gaps or orifices 66 and 69, thus precluding ingestion of oil and/or other contaminants into either side of the bearing. Vent holes 84 (FIGURES 1 and 2) permit equalization of pressure on both sides of rear wall 31 and prevent build-up of pressure on its rear side.

Figure 5:
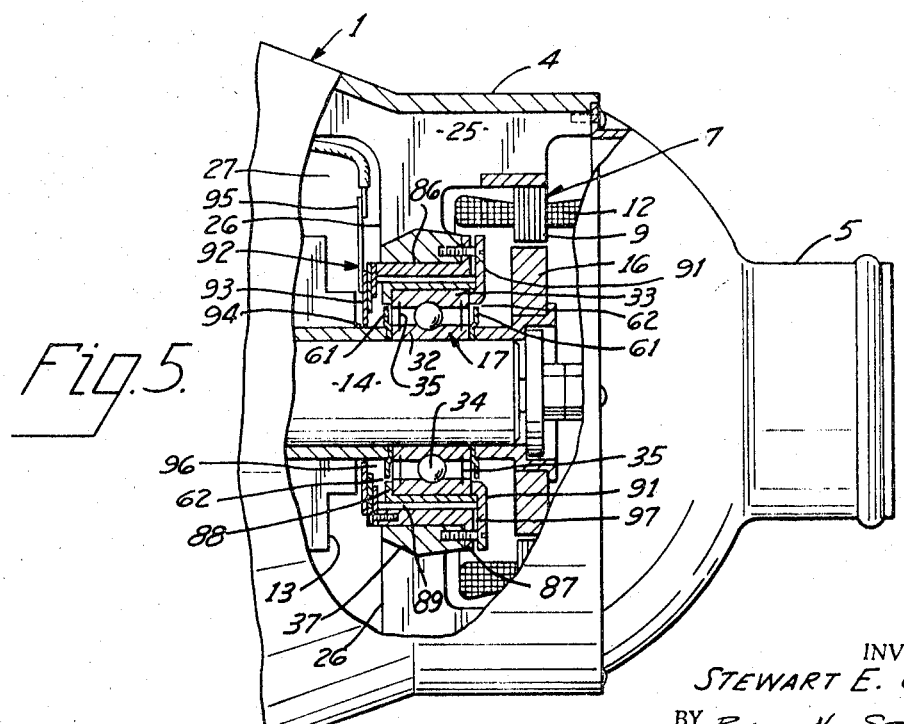
FIGURE 5 is a side elevation, parts being broken away, showing an alternative form of bearing structure that may be replaced for the front or right-hand bearing structure of FIGURE 1.

In the embodiment of FIGURE 5 showing a modified front bearing structure, parts essentially identical with those of FIGURES 1–4 bear identical reference characters. In this embodiment, the inner race 32 of the front bearing 17 is conventionally fixed to shaft 14. The outer race 33 is fixed in annular bearing support 86 mounted in hub 37.

Member 86 may be prefabricated from an inner and outer sleeve similarly to member 63. Member 86 also has a front external radial flange 87 by which it is located and secured in hub 37, and a rear internal radial flange 88 bearing against the rear face of the outer bearing race to aid in locating it axially. Member 86 also has numerous axial passages 89 formed between the splined inner sleeve and the outer sleeve. The splines project beyond the front of front flange 87 and beyond the rear of rear flange 88. A bearing retainer 91 bears against front of outer race 33 and is secured to hub 37 of the housing. There are narrow gaps 62 between the front and rear shields 61 and their associated bearing retainer 91 and rear flange 88 which serve to mechanically limit the deleterious entry of dirt to and against the bearing seals.

A rub detector 92 is fixed to the rear of bearing support member 87; it includes a metal rub detector plate 93 separated by narrow gap 94 from the exterior of shaft 14. Conductor means 95, as in previous embodiments, is connected to suitable alarm or shut-down means. The rub detector thus serves as a partition which substantially closes off from space 27 a space 96 adjacent the rear face of the bearing.

The space 96 communicates, through the axial passages 89 of member 87 and radial gap 97 between member 87 and bearing retainer 91, with the air at the front of the bearing structure. Gap 94 has a relatively smaller cross-sectional area than the area of axial passages 89 so that the pressure drop normally present across the bearing occurs substantially entirely at gap 94. Consequently, even if the air to which the front of the bearing structure is exposed should be at a considerably higher pressure than the air at the rear of the bearing structure, this causes no difficulties because the air in the immediate vicinity of the rear of the bearing structure is at substantially the same pressure. There is little, if any, pressure differential tending to blow lubricant out of the bearing. Consequently, blow-out of lubricant can be prevented.

Figure 6:
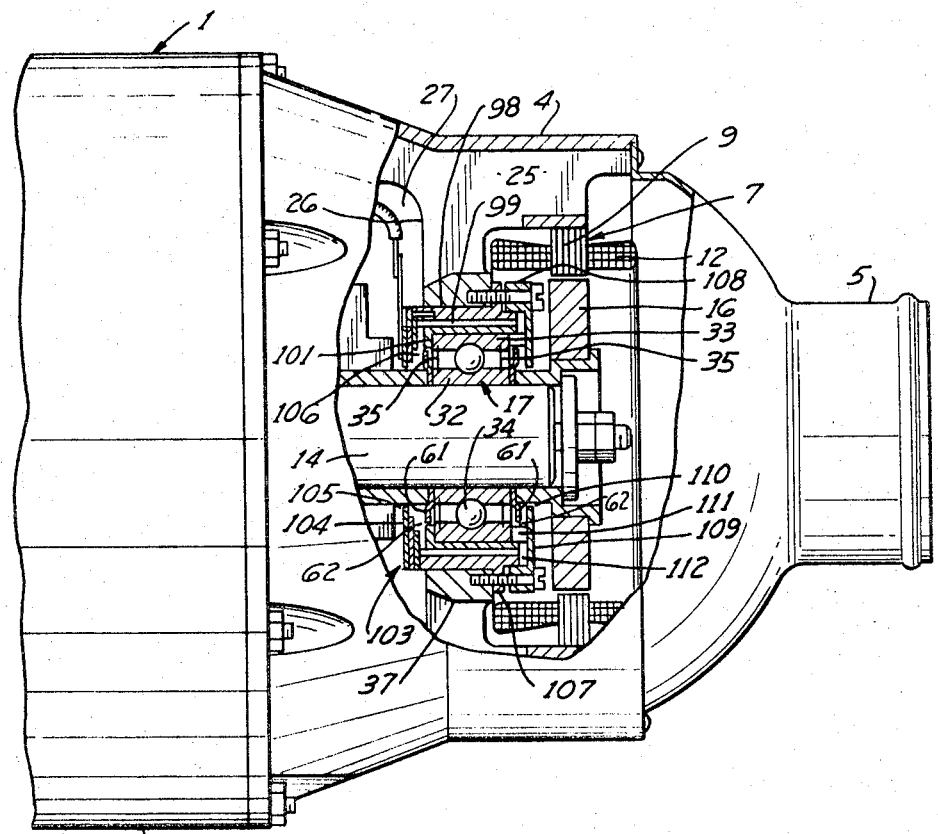
FIGURE 6 is another alternative bearing structure that may be replaced for the front bearing structure of FIGURE 1.

In the embodiment of FIGURE 6, in which parts that are essentially identical to those in FIGURE 1 bear identical references, the inner race 32 of the front bearing 17 is fixed to the shaft as in FIGURE 1. The outer race 33 is fixed in annular bearing support 98 having axially extending through passages 99, and which may be made similarly to member 36 of FIGURE 1. Member 98 has an inwardly extending rear radial flange 101 that engages the rear of the outer bearing race. Bearing shields or dirt slingers 61 are preferably provided.

A rotor rub detector 103, comprising a detector plate 104, is fixed to the rear of member 98. The gap 105 between the rub detector plate and the shaft is small. The detector thus serves as a partition which essentially closes off from space 27 a space 106 to which the rear of the bearing is exposed.

The front of member 98 has an outwardly extending radial flange 107 by which member 98 is located and secured in hub 37 of the front spider of housing 1. Bearing retainer 108 engages the outer surface of member 98 and has a portion 109 that extends radially inwardly close to the exterior of shaft 14, clearing it by a very small gap 110. Member 108 has inwardly extending lugs 111, separated by substantial gaps, that engage outer race 33 of the bearing to locate it axially in member 98. Member 108 thus acts as a partition and closes off from the space at the front of the partition means formed by the spider arms 26, the space 112 to which the front of the bearing is exposed.

Substantially identical air pressures are maintained in the immediate vicinity of both sides of the bearing in spaces 106 and 112 through relatively large area axial passages 99. The relatively small cross-sectional areas of gaps 105 and 110 divide the pressure drop across the whole bearing assembly and the bearing on both sides is subjected to and maintained at a pressure between the pressure level in spaces in front of and behind the bearing assembly. There is very litle, if any, pressure drop across the bearing that could cause blowing out of lubricant and other problems described above, and the bearing is thoroughly shielded against ingress of contaminants from either side by bearing shields or dirt slingers 61.

It is apparent that, in all of the embodiments of the invention, each of the bearings is subjected to substantially the same gas pressure on both its sides, even though the air pressure at one side of the bearing assembly may be substantially higher than the air pressure on the other side of the bearing assembly due to the flow of cooling air through the dynamoelectric machine. This prevents blow-out of lubricant. The bearings, moreover, are shielded against entrance of contaminants.

Each bearing structure provides pressure equalizing passages, and small orifices restricting flow air into, out of, or through the bearing.

Various modifications may be made in the disclosed embodiments without departing from the invention. It is intended that the patent shall cover, by suitable expression in the appended claims, whatever features of novelty reside in the invention.

I claim:

1. In a dynamoelectric machine having a housing, a rotor, a bearing carried by and within the interior space of said housing and supporting said rotor for rotation within the interior of said housing, and adapted to have a flow of gas passed through said machine tending normally and absent the herein improvement to produce a pressure drop across said bearing, the improvement comprising a partition mounted on one side of said bearing closing off a space adjacent said one side of said bearing from the remainder of the interior of said housing, a flow restricting orifice passage extending through and by said partition from said space adjacent said one side of said bearing and away from said bearing to the remainder of the interior of said housing, a pressure equalizing passage extending between said space adjacent said one side of said bearing and the other side of said bearing and the space adjacent thereto for tending to equalize the pressure on both sides of said bearing.

2. The dynamoelectric machine and improvement therein of claim 1 in which said pressure equalizing passage has a relatively larger cross-sectional area than the cross-sectional area of said flow restricting orifice passage.

3. The dynamoelectric machine and improvement therein of claim 1 together with another partition mounted on the other side of said bearing closing off a space adjacent said other side of said bearing from the remainder of said interior of said housing and a flow restricting orifice passage extending through and by said other partition from said space adjacent said other side of said bearing and away from said bearing to the remainder of said interior of said housing.

4. The dynamoelectric machine and improvement therein of claim 3 in which said pressure equalizing passage has a relatively larger cross-sectional area than the cross-sectional area of either of said flow restricting orifice passages.

5. The dynamoelectric machine and improvement therein of claim 4 in which one of said partitions comprises a rotor rub detector.

6. The dynamoelectric machine and improvement therein of claim 4 together with conduit means communicating with said pressure equalizing passage and a point in the flow of gas through the interior of said housing upstream of said bearing.

7. The dynamoelectric machine and improvement therein of claim 1 in which said partition is mounted in the flow of gas through the interior of said housing downstream of said bearing and in which said pressure equalizing passage extends between the downstream and upstream sides of said bearing.

8. The dynamoelectric machine and improvement therein of claim 1 in which said pressure equalizing passage comprises a plurality of axially extending channels in and through an annular bearing support fixed to and within the interior of said housing and surrounding and holding and supporting said bearing.

9. The dynamoelectric machine and improvement therein of claim 8 in which said bearing support comprises an inner sleeve having a generally smooth cylindrical axial bore for receiving and supporting said bearing and having an axially splined generally cylindrical outer surface, and an outer sleeve having a generally smooth cylindrical axial bore for receiving said inner sleeve so that said splines having mating engagement with the surface of said axial bore of said outer sleeve and together therewith forming a unitary structure having a plurality of axial passages through and circumferentially spaced about said bearing support and extending from one side to the other of a bearing supported thereby.

10. The dynamoelectric machine and improvement therein of claim 8 in which said bearing is held in said bearing support by an annular retainer ring fixedly mounted on said bearing support and having a radial flange on and next to said one side of said bearing and comprising said partition.

11. The dynamoelectric machine and improvement therein of class 10 in which said bearing is provided with an annular bearing shield mounted on said rotor next to said one side of said bearing and cooperating with said radial flange to comprise said partition.

12. The dynamoelectric machine and improvement therein of claim 11 in which said bearing is slip mounted for limited relative axial movement with and within said bearing support including said radial flange, and said radial bearing shield terminates in a radially outer axially extending cylindrical flange radially opposite said radial flange of said retainer ring at all positions of limited axial movement of said bearing in said bearing support.

References Cited
UNITED STATES PATENTS

| | | | |
|---|---|---|---|
| 3,016,273 | 1/1962 | Benoit | 310—90 |
| 3,207,934 | 9/1965 | Robinson | 310—90 |
| 3,303,898 | 2/1967 | Bercaru | 308—8.2 |
| 3,391,291 | 7/1968 | Benson | 310—90 |

WARREN E. RAY, Primary Examiner

R. SKUDY, Assistant Examiner